INVENTOR.
RICHARD A. WALLACE
BY
Arthur H Seidel
ATTORNEY

INVENTOR.
RICHARD A. WALLACE
BY
Arthur H. Seidel
ATTORNEY

CARD PUNCHING AND READING DEVICE

Filed Jan. 7, 1964 4 Sheets-Sheet 3

INVENTOR.
RICHARD A. WALLACE
BY
Arthur H. Seidel
ATTORNEY

INVENTOR.
RICHARD A. WALLACE
BY
Arthur H. Seidel
ATTORNEY

United States Patent Office 3,386,654

Patented June 4, 1968

3,386,654

CARD PUNCHING AND READING DEVICE

Richard A. Wallace, Norristown, Pa., assignor to Control Data Corporation, a corporation of Minnesota Filed Jan. 7, 1964, Ser. No. 336,285
3 Claims. (Cl. 235—61.1)

ABSTRACT OF THE DISCLOSURE

A card processor which has a card-path established by two card-transport structures confronting each other. One transport structure is pivotally movable relative to the other to a path-opening position to facilitate removal of jammed cards. Each transport structure supports complemental portions of card feeling sets of rollers, a punch mechanism, that is, the punch device and die respectively, and the sections of a check-read device.

The pivoted transport structure is normally locked in the position at which it, in cooperation with the other transport structure, establishes the card-path. To open the card-path, the pivoted transport structure is unlocked and pivotally actuated.

This invention relates to apparatus and method for processing cards. In particular, the present invention is directed to apparatus and method for punching, reading and transporting cards having spaced rows of holes corresponding to coded information.

The card processor of the present invention is adapted for rack mounting with the input and output of the cards being accomplished at the front face of the card processor. The card processor of the present invention is in the nature of row card handling equipment which is reliable, occupies minimum floor space, efficient, versatile, etc.

The card processor of the present invention includes an input hopper from which cards are sequentially fed one at a time to a ready station where the cards are held in readiness for punching. From this ready station, the cards progress under the punch head. If the card is to be punched, it is driven by a shuttle feed mechanism which steps the card twelve times for punching into eighty columns during each step. If the card is to be read only and not punched, clutch-controlled rollers move it under the punch head in constant motion at reading speed.

After passing the punch head, the card enters a second ready station located immediately before the read and reread brushes where it can be held in readiness for reading and rereading. After the second ready station, the card is driven into the read and reread brushes at constant speed. Reading and rereading are accomplished by two rows of eighty sets of spring wire brushes making contact with two rows of eighty metal segmented plates.

After reading, the card is deflected over a stacker drum and normally proceeds to a card stacker. As cards are delivered to the card stacker, they are positioned front face forward in the same manner that they were introduced into the input hopper. If a card is to be rejected due to a compare error, the card is deflected into a reject pocket. While processing cards, if jams should occur, the upper transport of the card processor of the present invention is mounted for easy pivotable movement to a position wherein the jam-up may be eliminated. Such jam-ups are detected by switches located along the card path.

The card processor of the present invention has two basic modes of operation. These modes are read-reread, and punch and check-read. In the former mode, the cards are processed at a rate of approximately 800 cards per minute. In the latter mode, the cards may be processed at a rate of up to 250 cards per minute. The card processor of the present invention can efficiently read-reread or punch and check-read in both a continuous and a demand mode. The two ready stations along the card path facilitate the efficient processing of cards in a demand mode so as to provide a minimum time lapse between a demand signal and punching or reading of a card.

It is an object of the present invention to provide a novel apparatus and method for processing cards.

It is another object of the present invention to provide a novel apparatus and method for a combined two speed reading and punching of cards.

It is another object of the present invention to provide a novel card processor having access for input and output of cards only from one end thereof.

It is another object of the present invention to provide apparatus and method for processing and transporting cards having read-reread and punch and check-read modes of operation.

It is another object of the present invention to provide a card processor having a pivotably mounted upper transport to facilitate the clearing of card jams.

It is another object of the present invention to provide apparatus and method for processing cards in a manner wherein cards may be punched and check-read at rates up to 250 cards per minute or read and reread at a rate of approximately 800 cards per minute in a continuous or demand mode.

It is another object of the present invention to provide a novel apparatus and method for processing cards on a thirteen point time cycle of 240 ms. per card during continuous punching.

Other objects will appear hereinafter.

For the purpose of illustrating the invention, there are shown in the drawings forms which are presently preferred; it being understood, however, that this invention is not limited to the precise arrangements and instrumentalities shown.

Referring to the drawing in detail, wherein like numerals indicate like elements, there is shown in FIGURE 1 a card processor designated generally as 10.

Figures 1, 2:
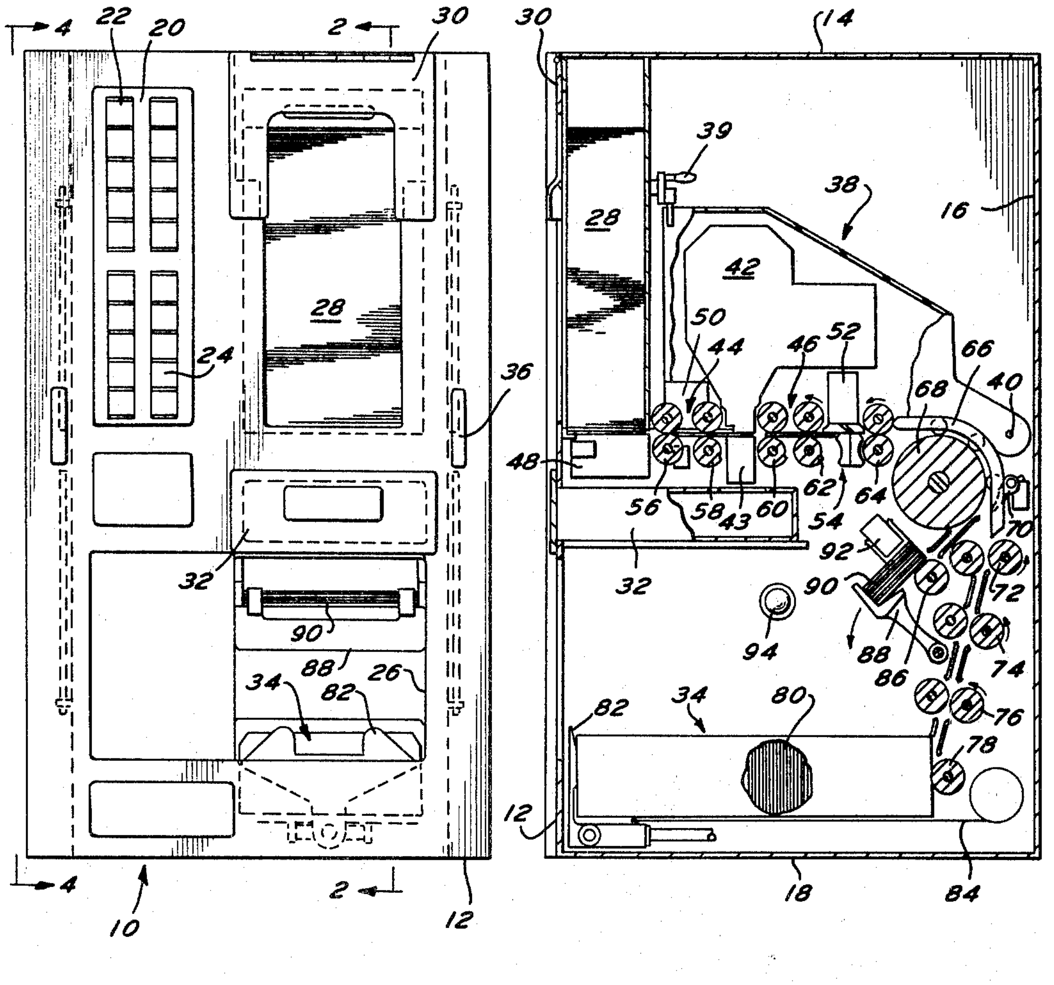
FIGURE 1 is a front elevation view of the card processor of the present invention.
FIGURE 2 is a sectional view taken along the line 2—2 in FIGURE 1.

The card processor 10 includes a housing having a front wall 12, a top wall 14, a back wall 16, a bottom wall 18, and side walls spaced apart for a distance less than the distance across the front wall 12. Hence, the width of the rear wall 16 will be less than the width of the front wall 12.

The front wall 12 is provided with a control panel 20 having a plurality of operation switches 22 and transport indicator switches 24. The front wall 12 is provided with an opening 26 for access to the processed cards, as will be made clear hereinafter.

Behind the front wall 12, there is provided an input hopper into which the cards will be placed face down. To facilitate the introduction of cards into the hopper 28, an access door 30 is hingedly connected at its upper edge to the front wall 12. The front wall 12 is provided with an opening so that the cards in the hopper 28 will be visible.

A chad drawer 32 is reciprocally supported by the housing, extends through the front wall 12, and is operable from a position in front of the processor 10. The opening 26 in the front wall 12 facilitates manipulation of cards in the output stacker 34 and reject pocket on the arm 88, as will be made clear hereinafter. A pair of latches 36 is provided on the front wall 12 to unlatch the processor 10 when it is rack mounted so that the same may be reciprocated out of its rack mounting in the same manner as a drawer on a filing cabinet.

Figure 4:
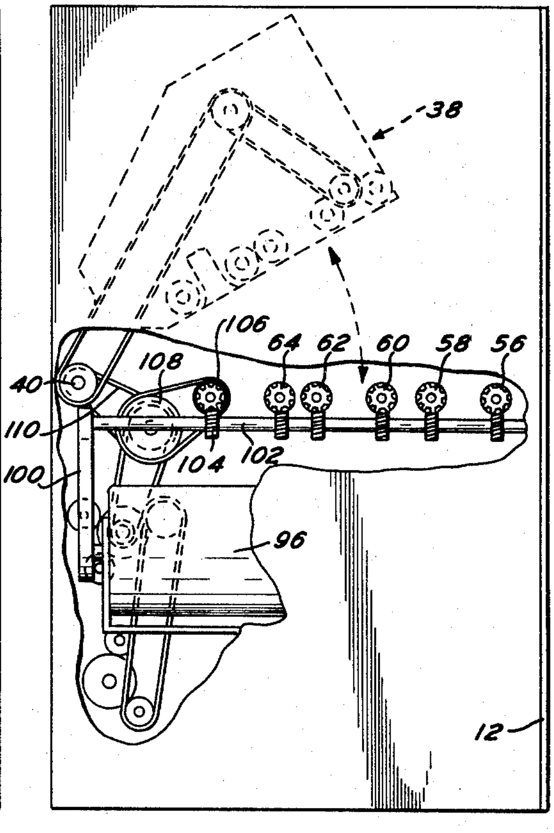
FIGURE 4 is a side elevation view taken along the line 4—4 in FIGURE 1, with parts broken away for clarity of illustration.

As shown more clearly in FIGURES 2 and 4, the processor 10 includes an upper transport 38 rotatably mounted by pin 40 and held in an operative position by latch 39. The upper transport 38 includes a conventional high speed punch 42. The punch 42 is diagrammatically illustrated and includes eighty interposer and magnet controlled punches above a punch die 43. The punches and die are arranged in a single row and the punches are driven by a cam shaft, not shown.

A first ready station 44 is provided for cards between the hopper 28 and the punch 42. A second ready station 46 is provided on the opposite side of the punch. A picked mechanism 48 is diagrammatically illustrated in FIGURE 2 below the hopper 28. Picker mechanism 48, per se, is conventional in the art and adapted to feed cards one at a time from the hopper 28 to the first ready station 44.

Below the upper transport 38, there is provided a lower transport 54. Transport 54 includes five sets of rollers, namely sets of rollers 56, 58, 60, 62 and 64. The rollers of set 56 are continuously rotating rollers. The lower roller of set 58 is relieved along one inch of its circumference and is solenoid-clutch controlled. Cards fed from the input hopper 28 by the mechanism 48 are moved from set 56 through punch 42 by a row indexing mechanism 50. Mechanism 50 may include twelve rows of spring loaded feed pawls for moving the card .250 inch in rapid sequential steps. Mechanism 50 is preferably synchronized with the punch mechanism by a timing belt.

The lower roller of set 60 is relieved along 1.75 inches of its circumference and is solenoid-clutch controlled. Sets 58 and 60 rotate under clutch control only when the processor is operating in the read mode. During a punch mode, sets 58 and 60 are de-clutched and remain idle with relieved surfaces rotated to a position to allow passage of the card during indexing by the row indexing mechanism 50.

The lower roller of set 62 is relieved along one inch of its circumference and is solenoid-clutch controlled. Set 62 is positioned in front of a read-reread device 52 having first and second sets of eighty brushes. The set of rollers 62 is used to inject the card through the brushes of device 52. Due to a clutch control, the rollers of set 62 can pick up the card either from ready station 46 when reading, or from the row indexing mechanism 50 when punching.

The rollers of set 64 are continuously rotated. The rollers of set 64 are disposed between the device 52 and a rotating stacker drum 68 and are adapted to feed cards between the drum 68 and an arcuate guide 66.

Cards are fed from the drum 68 to the output stacker 34 or to a reject pocket as determined by the position of a solenoid operated reject latch 70. In the position of the latch 70, the cards will be fed downwardly between guide channels and the driven rollers of sets of rollers 72, 74 and 76. Such cards are fed right side up, face forward, between the last card of the stack and the driven roller 78. The cards 80 will be maintained in such a relationship within the output stacker 34 by means of a pressure plate 82 biased toward the roller 78 by a constant force spring mechanism connected to plate 82 by cable 84. The plate 82 is wheel mounted and extends upwardly through a slot in the bottom wall of the output stacker 34.

When signals from the reread brushes do not compare with those from the read brushes, the latch 70 will be operated to a position whereby cards will be fed through giude channels, across roller 86 and into a pocket on the arm 88 rotatably mounted below the drum 68. A stack 90 of the cards may accumulate in the pocket and the arm 88 may be manually rotated to a position to facilitate removing the cards when desired. A lamp 94 is provided within the housing to facilitate observation of the stack of cards 90.

Figure 3:
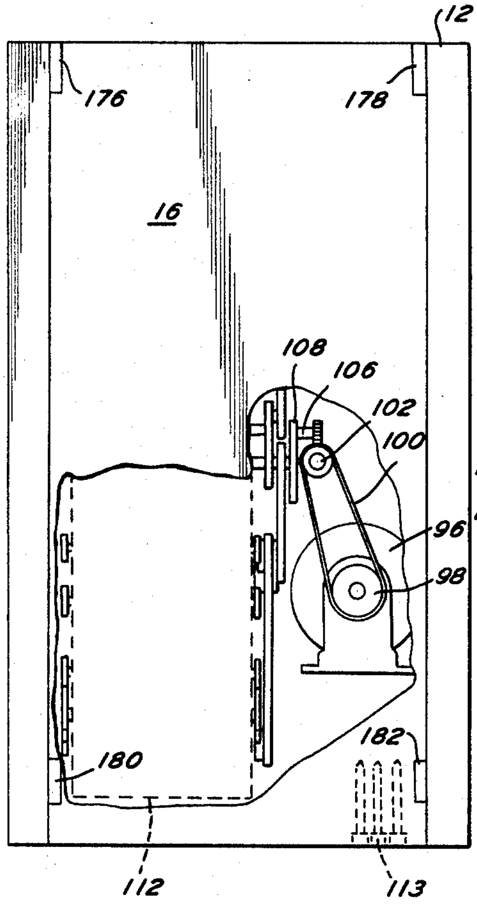
FIGURE 3 is a rear elevation view of the processor illustrated in FIGURES 1 and 2, with parts broken away for clarity of illustration.

As shown more clearly in FIGURES 3 and 4, a motor 96 is supported within the housing. The output shaft of the motor 96 is provided with a pulley 98 coupled to a drive shaft 102 by a belt 100. Each of the sets of rollers 56–64 are coupled to the shaft 102 by mating gears. A gear 104 on the shaft 102 is coupled with a mating gear to drive a roller 106. Roller 106 is coupled by a belt to a pulley 108. Pulley 108 is coupled by a belt to a pulley mounted on a shaft in line with pivot point 40 which drives the punch cam shaft and row indexing mechanism located in the upper transport 38. It will be noted that the upper roller of each of the sets 52–62 is movable with the upper transport 38. Hence, any jam-ups between the rollers of the various sets may be quickly eliminated by unlatching and pivoting the upper transport 38 through an arc of approximately 45 degrees, thereby exposing any cards between the rollers.

The card path is shown in phantom by the rectangle 112 in FIGURE 3. Plug-in receptacles 113, accessible through the bottom wall 18 of the housing, are provided for the punch magnet cable, read segment cable, and control cable.

Operation of the card processor 10 will be described in connection with the time displacement diagrams in FIGURES 5 and 6. With respect to FIGURE 5, there is illustrated a time displacement diagram for the punch-check-read mode for continuous feed operation or demand feed operation. The continuous feed operation will be described first.

Timing pulses for picking cards from the input hopper 28 by the picker mechanism 48, clutching at ready stations 44 and 46, and punching by the punch head 42, are from reluctance pick-ups. The roller clutches and the picker mechanism are timed from a four point timing disk located on the lower transport roller of set 56. Mounted on the same roller is a second disk with a sixteen point track which with a single reluctance pickup generates a timing pulse every 4,615 ms. for strobing of the read and reread brushes.

Figure 5:
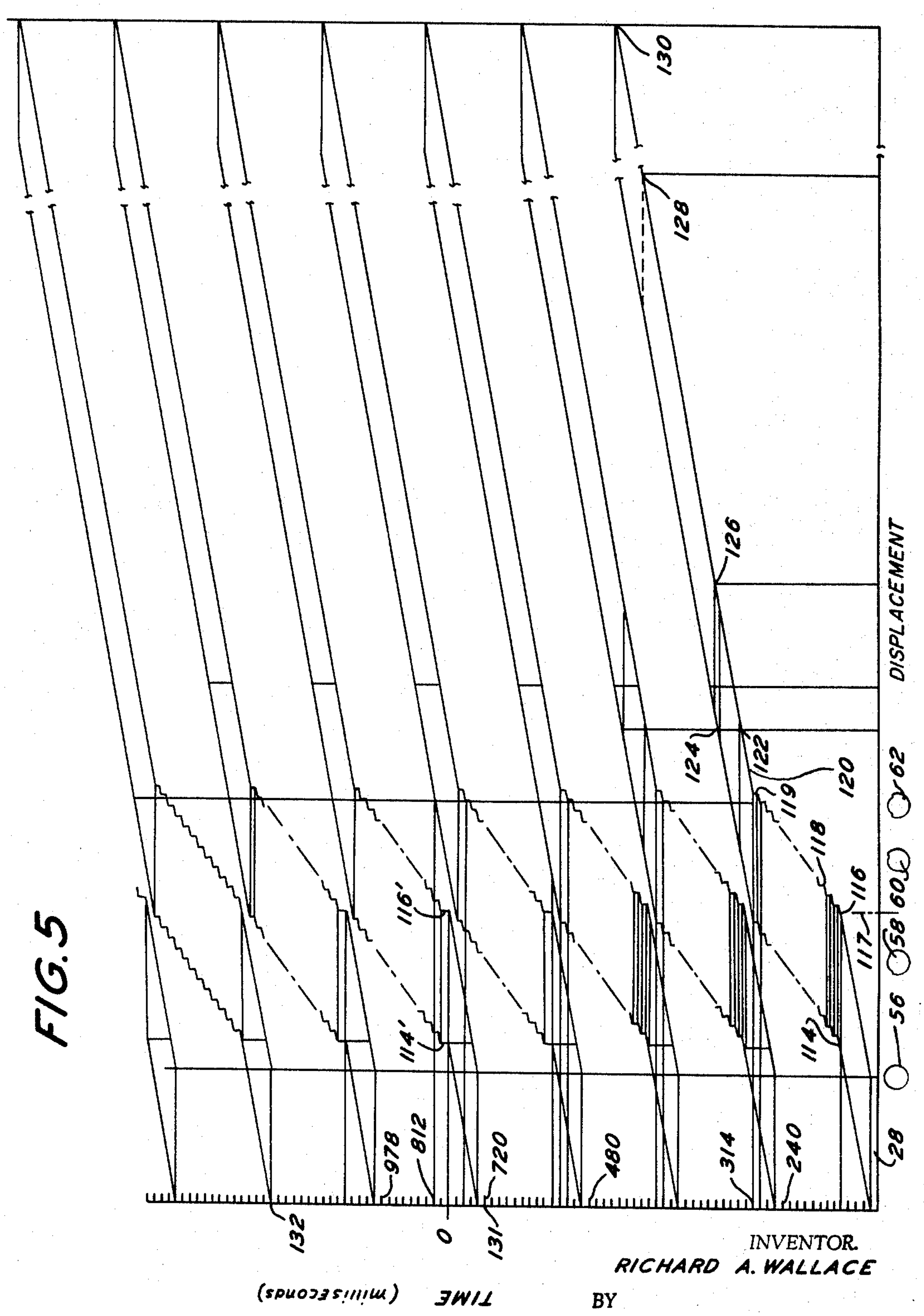
FIGURE 5 is a time displacement diagram of the processor operating as a punch.

Upon initial starting of the machine during the continuous punch-check-read operating mode, the mechanism 48 feeds the lowermost card from the input hopper 28 to the first set of transport rollers 56, and the card is transported to the first ready station 44, illustrated on FIGURE 5 between the points 114 and 116. It will be noted that the forward edge of the card is in line with the center line 117 of the punch.

Thereafter, the row indexer 50 will stroke each card .25 inch thereby performing thirteen strokes in 240 ms. Such stroking moves the front edge of the card from point 116 to point 119. During such stroking, the lower transporting rollers of sets 58 and 60 are idle.

After the passage of 240 ms., another signal to pick the lowermost card in the hopper is fed to the picker mechanism 48 and the above sequence repeated. About 10 ms. before the card reaches point 119, the lower transport roller of set 62 will be clutched so that it is rotated to thereby move the front edge of the card to point 120 and the rear edge will then assume the position of point 118. Points 118 and 120 constitute the second ready station 46. The lower transport roller of set 62 remains clutched for a sufficient length of time to transport the card to a point where the fifth set of rollers, set 64, engages the leading edge of the card at which point roller number 62 is de-clutched. At point 122, check reading is begun and at point 124 is completed by device 52. After completion of the check-read, the rollers of set 64 which are continuously rotating at a speed of approximately 800 r.p.m., inject the card around the drum 68. The passage of the card around the drum 68 is indicated by the point 126.

At point 128, the card will pass latch 70 and be either rejected with a total passage of 594 ms. or directed to the output stacker 34 with a total time pasage of 716 ms. as indicated at point 130. Since subsequent processing of additional cards under a continuous mode are identical as set forth above, it is believed that the entire process need not be repeated.

A description of the demand feed operation as illustrated in FIGURE 5 is as follows. In demand feed operation, cards are processed at a rate as determined by auxiliary or associated equipment such as a computer. When the card processor 10 of the present invention, operating on a continuous feed operation, receives a signal for demand feed operation at point 131, the card will be moved by the mechanism 48 to the position wherein its front and rear edges correspond to the points 116′ and 114′ respectively.

The card is now in the first ready station 44 and will remain there until a demand signal is received by the row indexer 50 to release the card from the first ready station. Thereafter, the card will be processed as set forth above wherein the card will be punched during the card dwell between movements effected by mechanism 50. Subsequent operations of demand feed operation are as set forth in the description of continuous feed operation. At any time during demand feed operation, such as at point 132, the card processor 10 may be reconverted to continuous feed operation. Regardless of the mode of operation, that is, demand or continuous feed operation, the cards will be displaced a distance of approximately 28.8 inches from the input hopper 28 to the card output stacker 34. At no time do two adjacent cards come closer than one-half inch.

Figure 6:
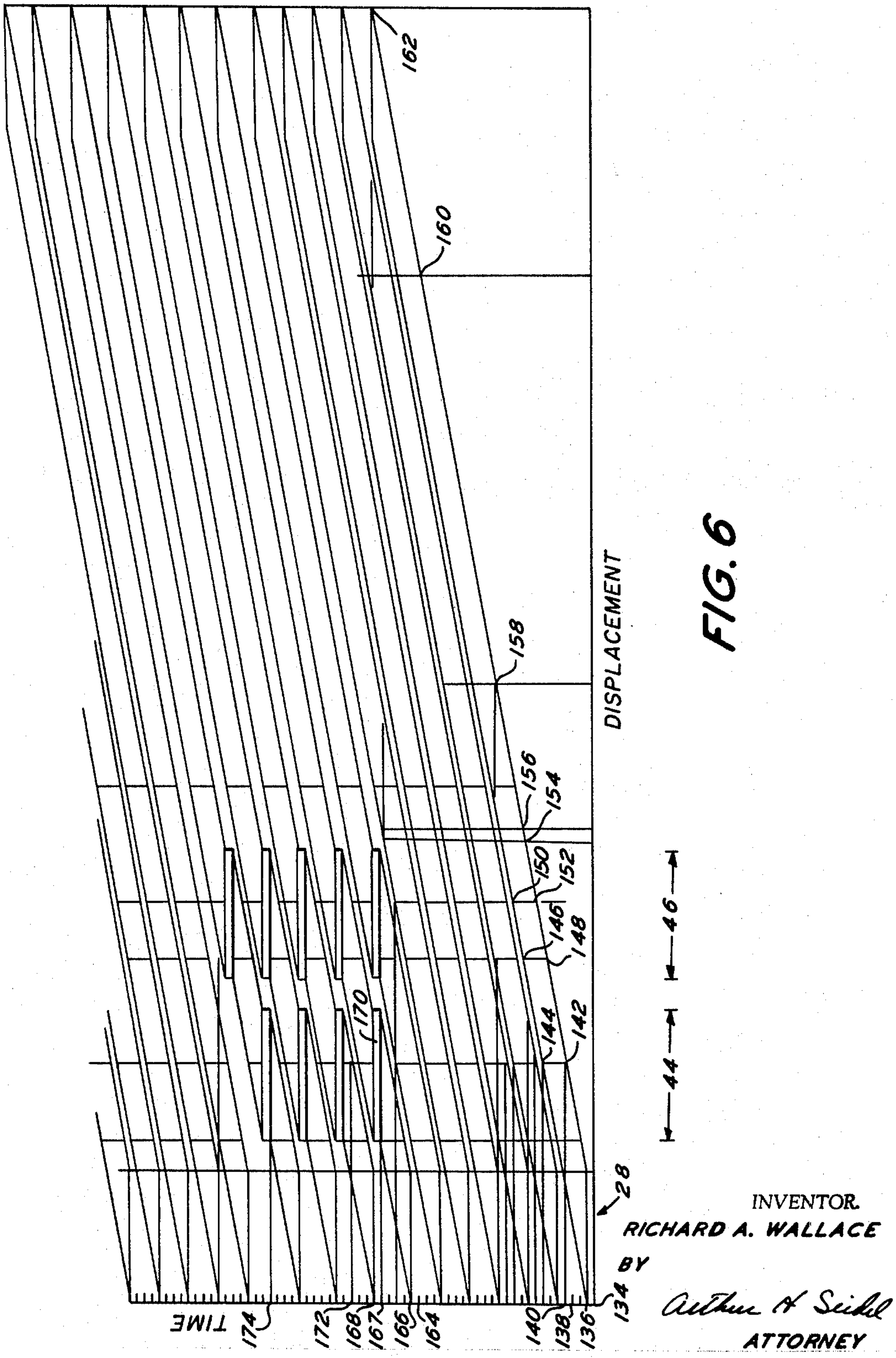
FIGURE 6 is a time displacement diagram of the processor operating as a reader.

In FIGURE 6, there is illustrated a time displacement diagram for the card processor of the present invention operating in the read-reread mode which may be continuous or demand feed operation. The continuous feed operation will be discussed first.

Upon initial operation of the processor at point 134, a signal will be received by the mechanism 48 to feed a card from the hopper 28. At point 136, the lowermost card will be fed from the hopper 28 into the first set of rollers 56 and proceed toward the first ready station 44. Before this card reaches the first ready station 44, a signal will be received at point 138 to engage the clutch for the rollers of sets 58 and 62. At point 140, a new signal will be received to pick the next card in the input hopper 28.

Point 142 indicates the point in time of initial contact with the card of the driving surface on roller set 58. Point 144 indicates the point in time in which the surface of the roller of set 58 leaves contact with the card. Before the rollers of set 58 lose contact with the card, a signal is sent to clutch roller set 60. At point 148, the first card is in contact with the peripheral surface of the roller of set 60, and at point 146, this roller loses contact with the card. It will be noted at this point that the first card is in the second ready station 46 and all rollers are synchronized and continuously rotating. Also, it will be noted that cards are moved directly through the first ready station 44 and toward the second ready station 46 without actuation of the row indexing mechanism or the punch.

Before losing contact with the surface of the roller of set 60, between points 146 and 148, the card contacts the peripheral surface of continuously rotating rollers of set 62 at point 152. The cards lose contact with the periphery of the last-mentioned rollers at point 150. At point 154, the cards are read by the device 52. At point 156, the cards are reread by the device 52.

At point 158, the cards pass over the drum 68. Any rejected cards enter the reject pocket at point 160. Those cards which are not rejected are delivered to the output stacker 34 at point 162. The total elapsed time between the signal received at point 134 and delivery of the cards to the output stacker 34 at point 162 is approximately 550 ms. The above sequence of operations for a continuous feed operation are repeated.

At any point in time corresponding to multiples of 18.46 ms. from zero time, such as point 164, a signal may be received for demand feed operation by the device 48. At point 166, the lowermost card in the hopper 28 will be transferred to the first ready station 44. The card is indicated at 170. Also, the card that was previously in the first ready station is in the second ready station 46. Prior to point 167, roller sets 58, 60 and 62 are de-clutched and in their home positions. At point 167, a demand signal may be given, whereupon rollers 58 and 62 are clutched and simultaneous movement of the cards in the second ready station, first ready station, and the input hopper will occur. At point 168, the clutch for the rollers of set 60 will be energized. Thereafter, during demand operation when the card in the second ready station is demanded for reading, the card from the first ready station moves into the second ready station, and the lowermost card in the input hopper moves into the first ready station.

Before the card 170 reaches the second ready station 46, a signal will be received at point 172 to disengage the clutches for the rollers of sets 58 and 62. Thereafter, the card 170 will remain in the second ready station 46 until a signal is received to read and reread the card 170. Thereafter, the card will be processed as set forth above in connection with demand operation and in FIGURE 5. At any time, such as at point 174, a signal may be received to convert to continuous feed operation which will be accomplished as set forth above.

The card processor 10 of the present invention is adapted to be rack mounted. For this purpose, the housing is provided with roller and guide surfaces 176, 178, 180 and 182 (see FIGURE 3) adapted to cooperate with wall mounted structure to facilitate reciprocation of the processor 10 into and out of an appropriate space. The processor 10 will remain in a wall mounted position so long as the latches 36 are secured. To remove the processor 10 from its wall mounted position, the latches 36 must be released.

It will be appreciated by those skilled in the art that the processor of the present invention includes components which per se are old in the art and need not be described in detail. For purposes of clarity, conventional components, wiring, etc., have not been shown or described.

The present invention may be embodied in other specific forms without departing from the spirit or essential attributes thereof and, accordingly, reference should be made to the appended claims, rather than to the foregoing specification as indicating the scope of the invention.

I claim:

1. A card processor operable in a punch and check-read mode, said processor including a frame, an input hopper connected to said frame to support a card supply from which cards are adapted to be withdrawn, confronting first and second card-transport structures arranged to provide a card transport path extending from said input hopper, means movably attaching said first structure to said frame for movement with respect to said second structure in a manner to open said card path for access to a jammed card in said path, sets of card-feed rollers spaced along the length of said path, said sets of rollers each having a first roller carried by said movable first structure and a second roller carried by said second card-transport structure, a punch mechanism in said path between adjacent sets of rollers, said mechanism including a punch device and a die, said punch device and die attached to said first and to said second transport structures to provide a card throat therebetween so that said punch mechanism throat opens concurrently with the remainder of said path by the movement of said first transport structure, and card check-read means having sections on opposite sides of said card path.

2. The subject matter of claim 1 wherein one section of said check-read means is carried by said movable first transport structure for movement therewith upon opening of said card path.

3. The subject matter of claim 2 wherein said means movably attaching said first transport structure to said frame include a pivot, and means for locking said first structure in a position at which said card path is established.

References Cited

UNITED STATES PATENTS

| | | | |
|---|---|---|---|
| 2,377,525 | 6/1945 | Schutt | 271—51 |
| 2,690,221 | 9/1954 | Brand et al. | 235—61.1 |
| 2,828,912 | 4/1958 | Maul | 235—61.1 |
| 2,995,241 | 8/1961 | Klotz | 235—61.7 |
| 3,027,068 | 3/1962 | Iwai et al. | 234—126 |

MAYNARD R. WILBUR, *Primary Examiner.*

T. J. SLOYAN, *Assistant Examiner.*